(12) United States Patent
Han

(10) Patent No.: US 7,466,043 B2
(45) Date of Patent: Dec. 16, 2008

(54) LINEAR MOTOR GUIDE APPARATUS

(76) Inventor: Wol-Suk Han, 1210, Oncheon-Dong, Dongrae-Gu, Busan 607-060 (KR)

( * ) Notice: Subject to any disclaimer, the term of this patent is extended or adjusted under 35 U.S.C. 154(b) by 17 days.

(21) Appl. No.: 11/651,780

(22) Filed: Jan. 10, 2007

(65) Prior Publication Data

US 2007/0108849 A1    May 17, 2007

Related U.S. Application Data

(63) Continuation of application No. PCT/KR05/02549, filed on Aug. 5, 2005.

(30) Foreign Application Priority Data

| Aug. 9, 2004 | (KR) | ............... | 20-2004-0022569 |
| Jul. 6, 2005 | (KR) | ............... | 10-2005-0060897 |

(51) Int. Cl.
*H02K 41/00* (2006.01)
(52) U.S. Cl. ........................................... 310/13
(58) Field of Classification Search ............ 310/12, 310/13, 15
See application file for complete search history.

(56) References Cited

U.S. PATENT DOCUMENTS

| 5,225,725 | A | * | 7/1993 | Shiraki et al. | ............... | 310/12 |
| 5,565,718 | A | | 10/1996 | Takei | | |
| 6,348,746 | B1 | * | 2/2002 | Fujisawa et al. | ............... | 310/12 |
| 6,847,132 | B2 | * | 1/2005 | Ukaji | ............... | 310/12 |

FOREIGN PATENT DOCUMENTS

| JP | 02-109648 A | 4/1990 |
| JP | 03-218249 A | 9/1991 |
| JP | 07-274474 A | 10/1995 |

OTHER PUBLICATIONS

International Search Report (PCT/KR2005/002549), Oct. 27, 2005, 2 pages.

* cited by examiner

*Primary Examiner*—Tran Nguyen
(74) *Attorney, Agent, or Firm*—Park & Associates IP Law LLC

(57) ABSTRACT

The present invention relates to a linear motor guide apparatus, which comprises a linear motor stator and rotor; an up-projecting partitions, an LM (linear motor) rail and an LM (linear motor) block installed in a main base; and a main cover installed elastically in the longitudinal direction, so that the installation of the apparatus is convenient, and the whole apparatus can be reciprocally moved a certain distance stably. A linear motor guide apparatus according to the present invention is mounted to a work robot, in which a reciprocal moving means reciprocally moves within the length of the whole apparatus in the longitudinal direction, the apparatus comprising: a main base which has the whole apparatus had a predetermined width and length, and on which elements of the apparatus are mounted; drive means positioned on the main base; reciprocal moving means, installed on the main base, for reciprocally moving within the length of the whole apparatus in the longitudinal direction, by driving force of the drive means; and a main cover, which is installed on the reciprocal moving means, and is engaged with lateral covers covering lateral end portions of the main base.

14 Claims, 10 Drawing Sheets

LINEAR MOTOR GUIDE APPARATUS

REFERENCE TO RELATED APPLICATIONS

This a continuation of pending International Patent Application PCT/KR2005/002549 filed on Aug. 5, 2005, which designates the United States and claims priorities of Korean Patent Application No. 10-2005-0060897 filed on Jul. 6, 2005; No. 20-2004-0022569 filed on Aug. 9, 2004.

FIELD OF THE INVENTION

The present invention relates to a linear motor guide apparatus, which comprises a linear motor stator and a linear motor rotor; an up-projecting partitions formed on the main base, an LM (linear motor) rail and an LM (linear motor) block installed on the main base; and a main cover installed elastically in the longitudinal direction, whereby the installation of the apparatus is convenient, and the whole apparatus can be reciprocally moved a certain distance stably. In addition, the present invention relates to a linear motor guide apparatus which ensures a stability in operation as well as an increased traveling distance by constructing the main cover in a non-contacting fashion that the main cover attached to a main base does not crook down, and supplies the lubricant to an LM rail and an LM block without separating the main cover.

BACKGROUND OF THE INVENTION

A linear motor guide apparatus, which is mounted to a work robot (not shown), is widely used to enable a precise reciprocal transportation. However, the conventional linear motor guide apparatus has disadvantages in that when it is necessary for the long-distance transportation, the linear motor guide apparatus crooks down because of its own heavy weight, and it is inconvenient to mount the linear motor guide apparatus to the operation robot.

SUMMARY OF THE INVENTION

The present invention has been developed to avoid the above-mentioned problems of the conventional linear motor guide apparatus. Therefore it is an object of the present invention to provide a newly configured linear motor guide apparatus, which can be mounted to the conventional work robot in a simple way, and in which the longitudinal cross-section of the apparatus is enlarged to prevent the crooking down of the apparatus when in use and longitudinal stiffness is reinforced to prevent twisting and bending of the apparatus.

It is another object of the present invention to provide a linear motor guide apparatus, which is constructed in a non-contacting fashion that the bottom of a main cover is supported by a supporting body fixed to a main base, and includes an oil supply nipple that supplies the lubricant to an LM rail and an LM block without separating the main cover.

To achieve the above objects, according to the present invention, there is provided a linear motor guide apparatus mounted to a work robot, the apparatus including: a main base which is so sized as to allow the whole apparatus to have a predetermined width and length, and on which elements of the apparatus are mounted; drive means disposed on the main base; reciprocal moving means installed on the main base, for reciprocally moving a certain distance within the length of the whole apparatus in the longitudinal direction, by a driving force of the drive means; and a main cover installed on the reciprocal moving means, and engaged with lateral covers coupled to both lateral portions of the main base to cover both lateral portions of the main base.

According to a feature of the present invention, an LM rail, of which the flanks are respectively concaved along the longitudinal direction, is installed in the main base, to the extent of a predetermined length.

According to a feature of the present invention, the main cover is attached to an engaging space formed in a table an upper portion of which is enclosed, and an opening portion is formed at the lower portion of the engaging space, so that at least one supporting body is built in the opening portion to engage with the main cover, the supporting body being fixed at a lower portion thereof to the main base.

According to a feature of the present invention, both sides of the main cover are bent downward to form a bent side which surrounds the outside of a body side of the main base, both sides of the table form side space portions downward bent to correspond to the bent side, the side space portions communicating with the engaging space of the table.

According to a feature of the present invention, the drive means is a linear motor stator.

According to a feature of the present invention, the main cover includes: recesses inwardly concaved from the respective lateral ends of the main cover, elongated hollow portions formed near the ends of the recesses, and lateral covers fixed to the recesses by fixing means through the medium of an elastic block.

According to a feature of the present invention, the main base includes: up-projecting partitions facing each other in a central portion in such a fashion as to spaced apart from each other by a certain width, one of the up-projecting partitions having a scale attached to an inner surface thereof so that the traveling distance can be measured; and up-projecting members, which has generally the same shape as that of the up-projecting partitions and each of which faces each the up-projecting partition.

According to a feature of the present invention, the reciprocal moving means comprises at least one LM block having a concaved portion whose shape and location is corresponding to the concaved portion of the LM rail, so that the LM block can linearly reciprocally move along the LM rail stably and without swaying, the LM blocks are attached to the bottom of the table, and the table includes a linear motor rotor facing the linear motor stator, and the table is located so that it can move in a non-contacting fashion along the edge surface of the main cover, whereby the reciprocal moving means reciprocally move by the interaction of the linear motor stator and the linear motor rotor.

According to a feature of the present invention, the reciprocal moving means comprises: a scale head, whose one side sildably moves along the up-projecting partitions of the main base and a predetermined shaped scale attached thereto, by which the traveling distance is measured; and a scale block, which is integrally coupled with the top portion of the scale head, and which is fixed at one end thereof on one side of the table through fixing means.

According to a feature of the present invention, four stopper blocks are positioned at the respective corners of the main base, so that they are fixed to the main base by fixing means, and also to the respective lateral covers by fixing means, whereby an end portion of the respective stopper blocks facing each other have a protruding cushion.

According to a feature of the present invention, a plurality of sensors for sensing the position of the reciprocal moving means installed on the main base along with the LM block, the sensors being arrayed at a predetermined location of the main base along the direction of the movement of the reciprocal moving means.

According to a feature of the present invention, the main base comprises fixing means including a tapped hole member formed at the bottom of the main base, and a bolt coupling member formed at the LM block, whereby the members are selected to upward or downward fix the apparatus with an external apparatus.

According to a feature of the present invention, a stepped penetration hole is formed on lateral ends of the main cover.

According to a feature of the present invention, an oil flowing channel is penetratingly formed at the side of the table, each of which is interconnected with the LM block attached to the main base, the oil flowing channel including an oil supply nipple.

BRIEF DESCRIPTION OF THE DRAWINGS

The above and other objects, features, and advantages of the present invention will become more apparent from the following description when taken in conjunction with the accompanying drawings, in which.

DETAILED DESCRIPTION OF THE INVENTION

Hereinafter, a linear motor guide apparatus according to the present invention will be described in detail with reference to the attached drawings.

Figure 1:
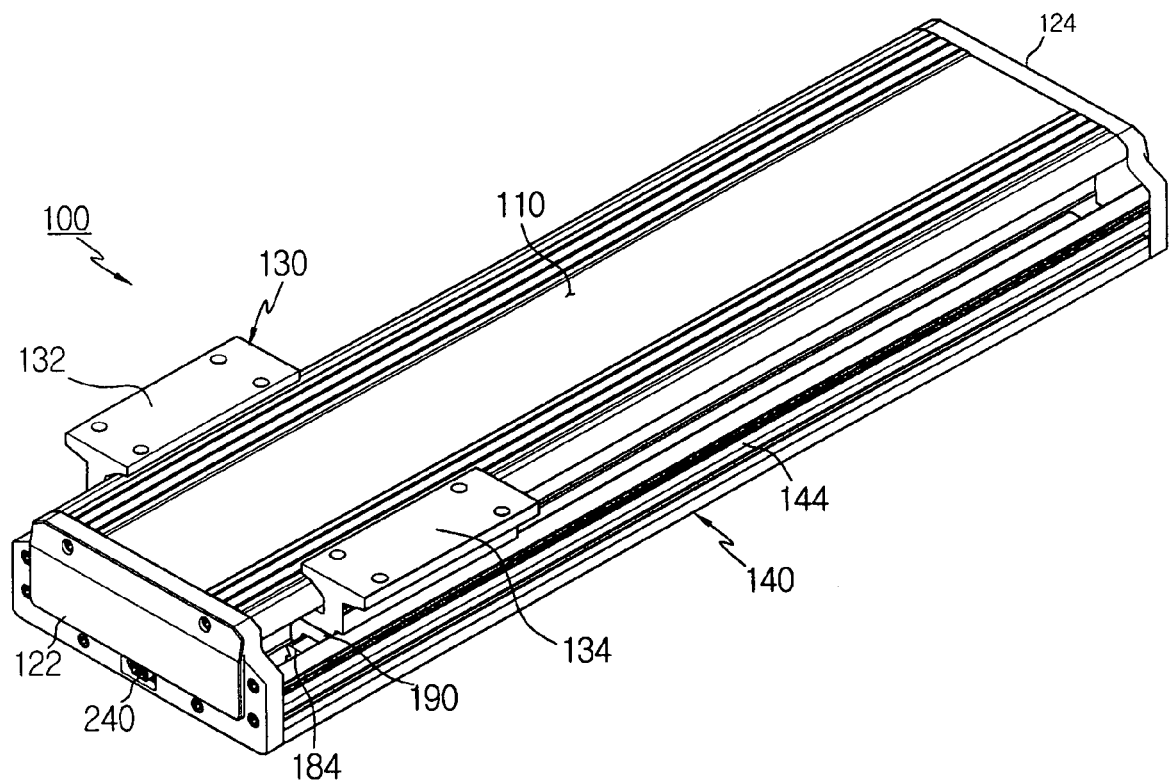
FIG. 1 is a perspective view generally showing a linear motor guide apparatus according to the present invention.
Figure 2:
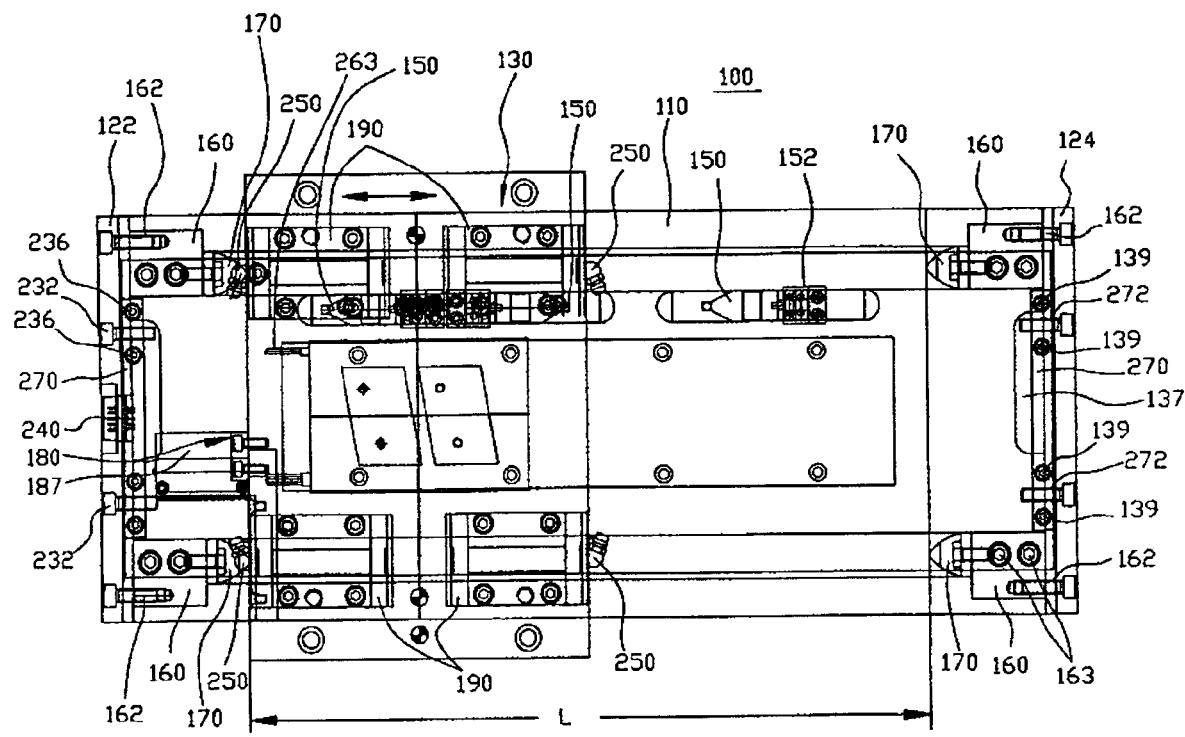
FIG. 2 is a plan view of the apparatus of FIG. 1.
Figure 3:
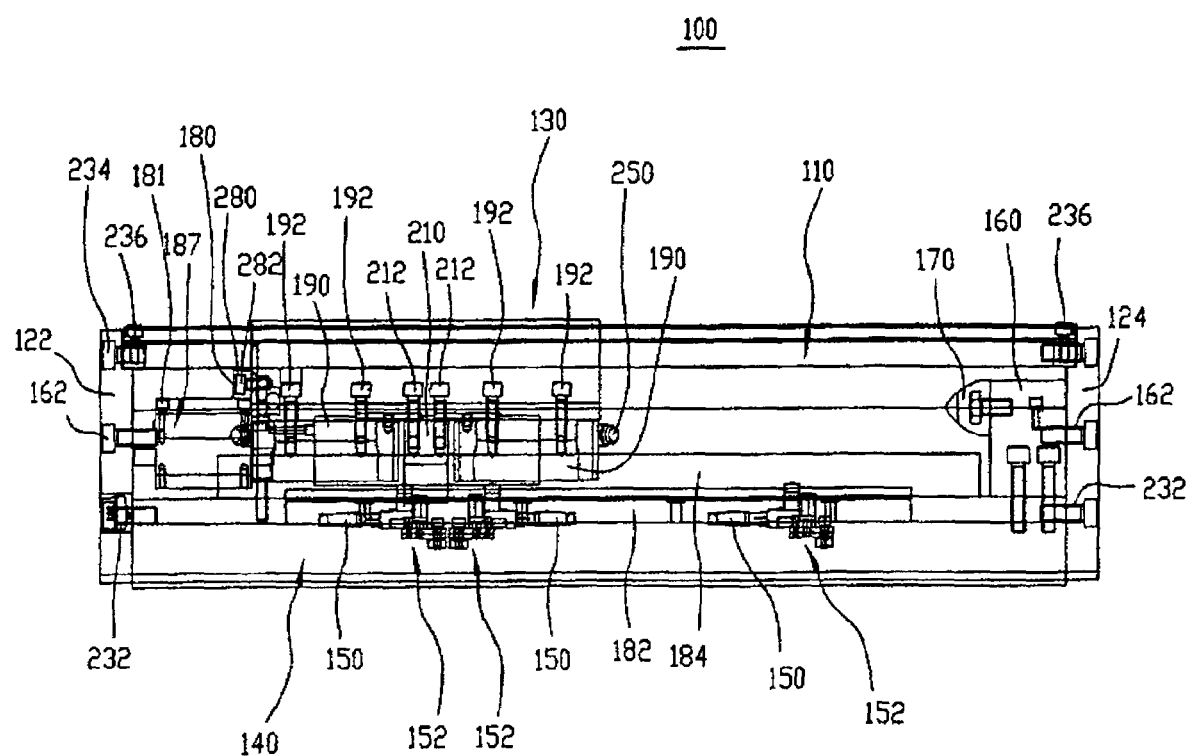
FIG. 3 is a longitudinal side view of the apparatus of FIG. 1.
Figure 4:
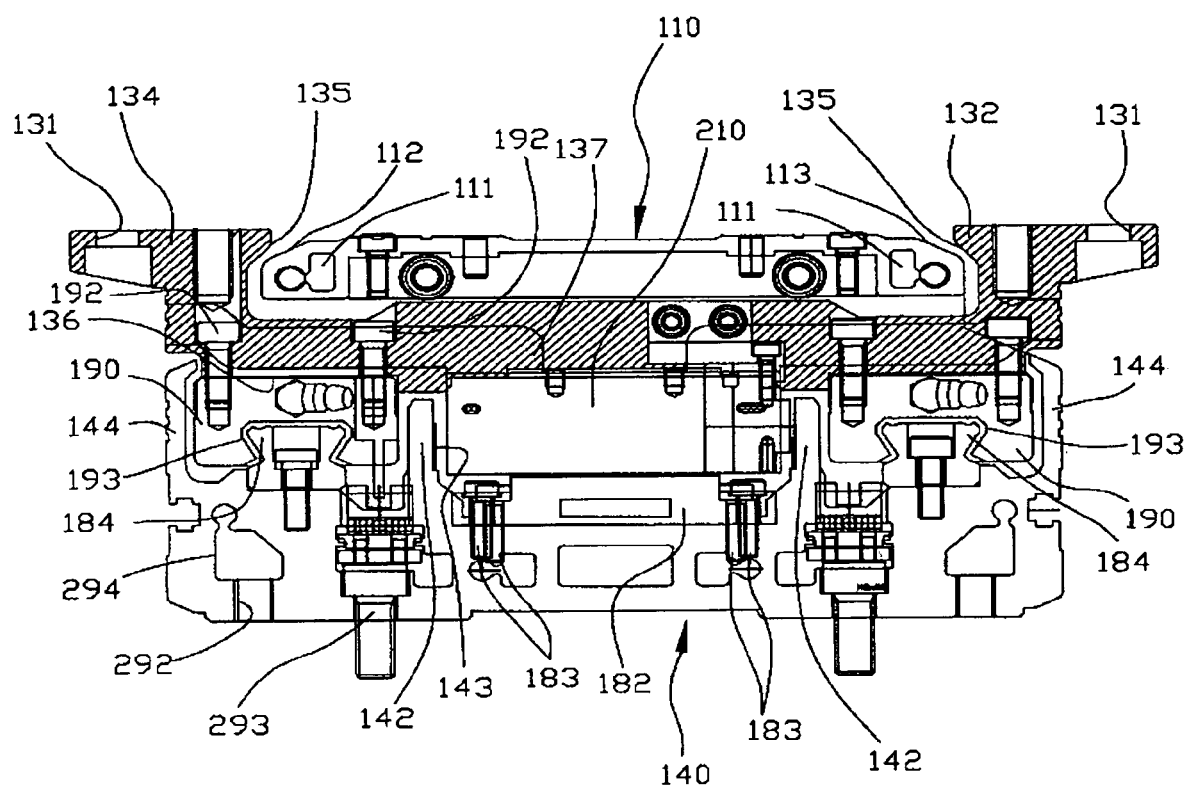
FIG. 4 is a traverse side view of the apparatus of FIG. 1.

FIG. 1 is a perspective view generally showing a linear motor guide apparatus according to the present invention, FIG. 2 is a plan view of the apparatus of FIG. 1, FIG. 3 is a longitudinal side view of the apparatus of FIG. 1, and FIG. 4 is a traverse side view of the apparatus of FIG. 1.

As shown in the drawings, a linear motor guide apparatus 100 has generally a rectangular shape when viewed from the top. The linear motor guide apparatus 100 is built by assembling a plurality of elements.

A reference numeral "140" denotes a main base, which is a foundation for the whole apparatus and receives multiple elements on it. Referring to the side view shown in FIG. 4, the main base 140 comprises up-projecting partitions 142, facing each other in a central portion, with which a scale head 187 fixed to a scale block 180, which will be described later, is in contact therewith and moves. The up-projecting partition 142 reinforces the main base 140, prevents the oil, which leaks from between an LM (linear motor) rail 184 and an LM block 190, from flowing towards a scale 143, and blocks the introduction of any alien substance. Further, it protects the residual grease on a surface of the LM rail 184 from scattering, during a fast reciprocal movement of a table 130, onto the surfaces of the scale head 187 fixed to the scale block 180 and a scale 143 attached to the up-projecting partitions 142, causing an error. To the inner surface of the up-projecting partition 142 is attached a scale 143, on which lines are marked so that the traveling distance can be measured.

In a space between the respective up-projecting partitions 142, a linear motor stator 182 and a linear motor rotor 210 are secured. The main base 140 further comprises two hook-shaped body sides 144, each of which faces each the up-projecting partition 142; the LM block 190 which is engaged with the LM rail 184 located between the up-projecting partition 142 and the body side 144; a table 130 which is installed on the LM block 190, so that it can reciprocally move on the LM rail 184; a main cover 110, positioned on the table 130, for covering the upper portion of the main base 140 and for preventing the table 130 from crooking down, by being associatively engaged with both sides of the table 130; and lateral covers 122, 124 for covering the lateral ends of the main base 140.

The lateral covers 122, 124 are elastically attached to the both lateral ends of the main cover 110. With reference to FIG. 2 showing a top view of the preferred embodiment of the present invention, recesses 137 are inwardly concaved from the respective lateral ends of the main cover 110, and elongated hollow portions 111 are formed near the ends of the recesses 137 (see FIG. 4). Each of the lateral cover 122, 124 is fixed to the vicinity of the recess 137 by fixing means 139 through the medium of an elastic block 270.

More specifically, the LM rail 184, of which the flanks are respectively concaved along the longitudinal direction, and which is installed in the main base 140, to the extent of a certain length, i.e., the distance L of the reciprocal traveling of the table 130. The LM block 190 also has a concaved portion 193, whose shape and location is corresponding to that of the LM rail 184, so that they can join each other so as to linearly reciprocally move. In the preferred embodiment, there is shown four LM blocks 190, however, the number of the LM blocks 190 may be changed in accordance with the number of the table 130.

From the side view, the upper portion of the table 130 substantially surrounds the main cover 110, but is not in touch with it. The table 130 has inner end portions 132, 134, each of which projects inward and has a slant surface 135 on its introverting side. The slant surfaces 135 are in close vicinity to edges 112, 113 of the main cover 110. Also, the upper portion of the table 130 is in close vicinity to the lower surface of the main cover 110.

The upper portion of the linear motor rotor 210 is attached to the lower portion of the table 130. Also the LM block 190 is attached to the lower portion of the table 130 by a bolt 192. A reference numeral "131" denotes a stepped penetration hole formed on extruding edges of the table 130, of which the upper diameter is smaller than the lower diameter. Other various mechanisms can be optionally mounted on the upper surface of table 130, the mechanisms being fixed either by bolting upward or by bolting downward.

From the plan view in FIG. 2, it is noted that the width of the table 130 is wider than that of the main base 140. Although the width of the table 130 may be substantially equal to that of the main base 140, the table 130 wider in width (see FIG. 2, etc.) exhibits the steadier table function.

From FIG. 2 showing the plan view, it can be noted that four LM blocks 190 are attached to the table 130.

A reference numeral "160" denotes stopper blocks. Four of the stopper blocks 160 are positioned at the respective corners of the linear motor guide apparatus 100, so that they are fixed to the main base 140 by fixing means 163, and also to the respective lateral covers 122, 124 by fixing means 162. An end portion of the respective stopper blocks 160 facing the table 130 having a protruding cushion 170 such that they can elastically get in touch with the side of the table 130.

A reference numeral "150" refers to sensors for sensing the position of the moving table 130 with the LM block 190 attached therebeneath. The sensors 150 are arrayed at a certain location of the main base 140 along the direction of the movement of the table 130. In the preferred embodiment, it is shown that the number of the sensors 160 is three.

A reference numeral "180" refers to a scale block, which is fixed at one edge of the table 130 by fixing means. Further description about the scale block will follow later, with reference to FIGS. 5 to 7 and 6.

A reference numeral "240" denotes a connection terminal for electric power supply.

A reference numeral "263" denotes a feed wire connected to an input power supply terminal of the linear motor rotor 210. In the mean time, beside the feed wire of the linear motor rotor 210, there is a wire connected to a pulse output terminal. Detailed explanation about these wires is omitted here.

A reference numeral "292", see FIG. 4, denotes a fixing member for fixing the linear motor guide apparatus 100 to a work robot (not shown). The fixing member 292 is a tapped hole extending downward from a hollow portion 294 formed at the bottom of the main base 140 in the longitudinal direction. The linear motor guide apparatus 100 is mounted to an external system through the fixing member 292.

A reference numeral "293" stands for a fixing member for fixing the main base 140, which is a projecting bolt with threaded surface. The main base 140 is fixed to other devices through the fixing member 293.

Figure 5:
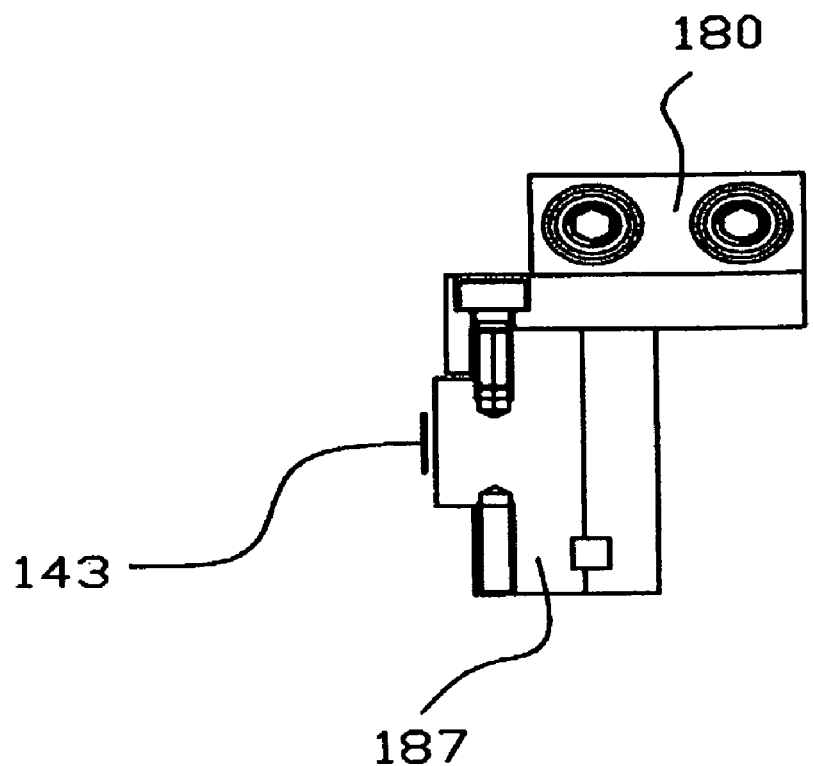
FIGS. 5 to 7 are respectively a front view, a plan view, and a side view of a scale head shown in FIG. 2.
Figure 6:
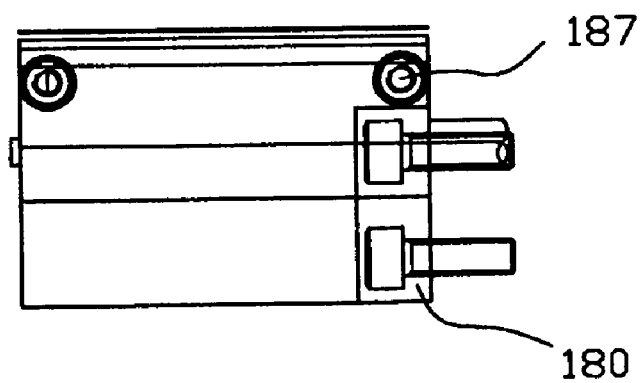
Figure 7:
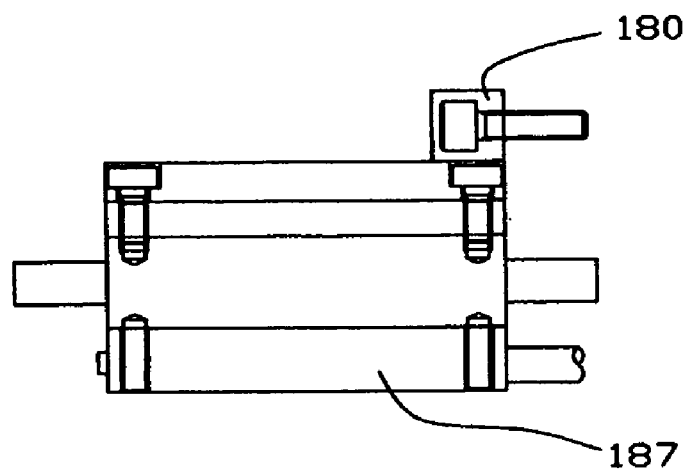
Figure 8:
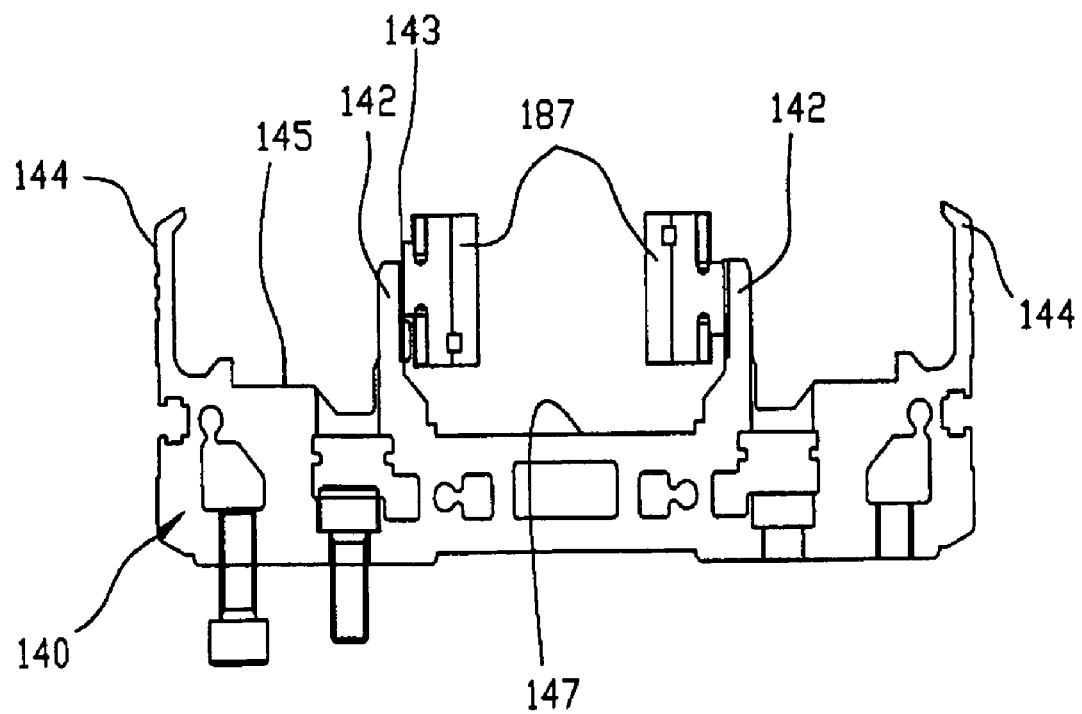
FIG. 8 is a side view showing the integration relationship between a main base and a scale head of FIG. 2.

FIGS. 5 to 7 are respectively a front view, a plan view, and a side view of a scale head shown in FIG. 2, and FIG. 8 is a side view showing the integration relationship between a main base and a scale head of FIG. 2.

As is shown, the scale block 180 is fixed on one side of the table 130 having a scale head 187, which is integrally coupled with the bottom of the scale block 180 and whose one side moves along the up-projecting partitions 142 of the main base 140 and the scale 143 attached thereto.

A reference numeral "145" denotes a surface where the LM rail 184 is attached, and a reference numeral "147" denotes a surface where the linear motor stator 182 is attached.

Figure 9:
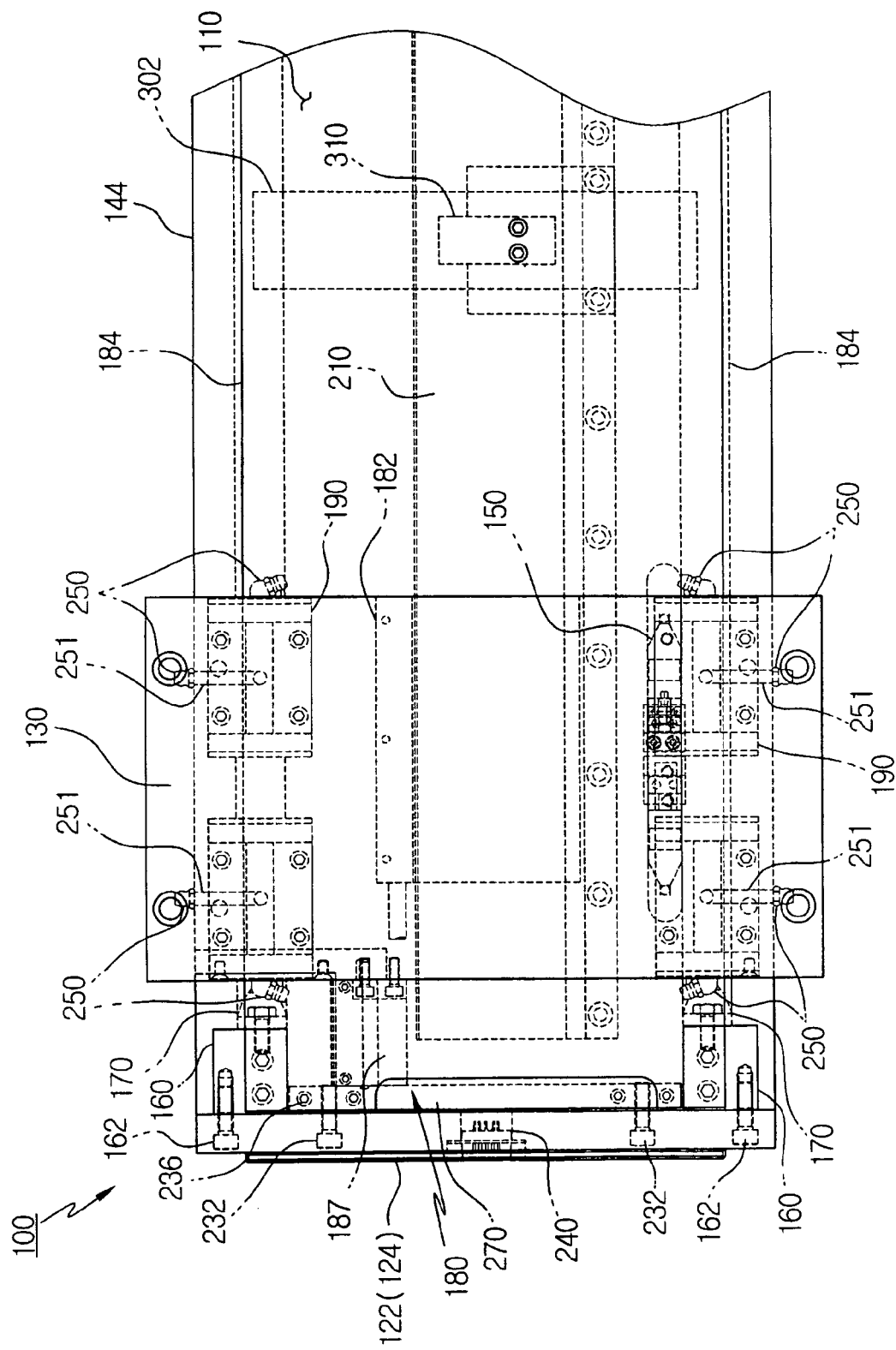
FIG. 9 is a perspective view showing a linear motor guide apparatus according to a second embodiment of the present invention.
Figure 10:
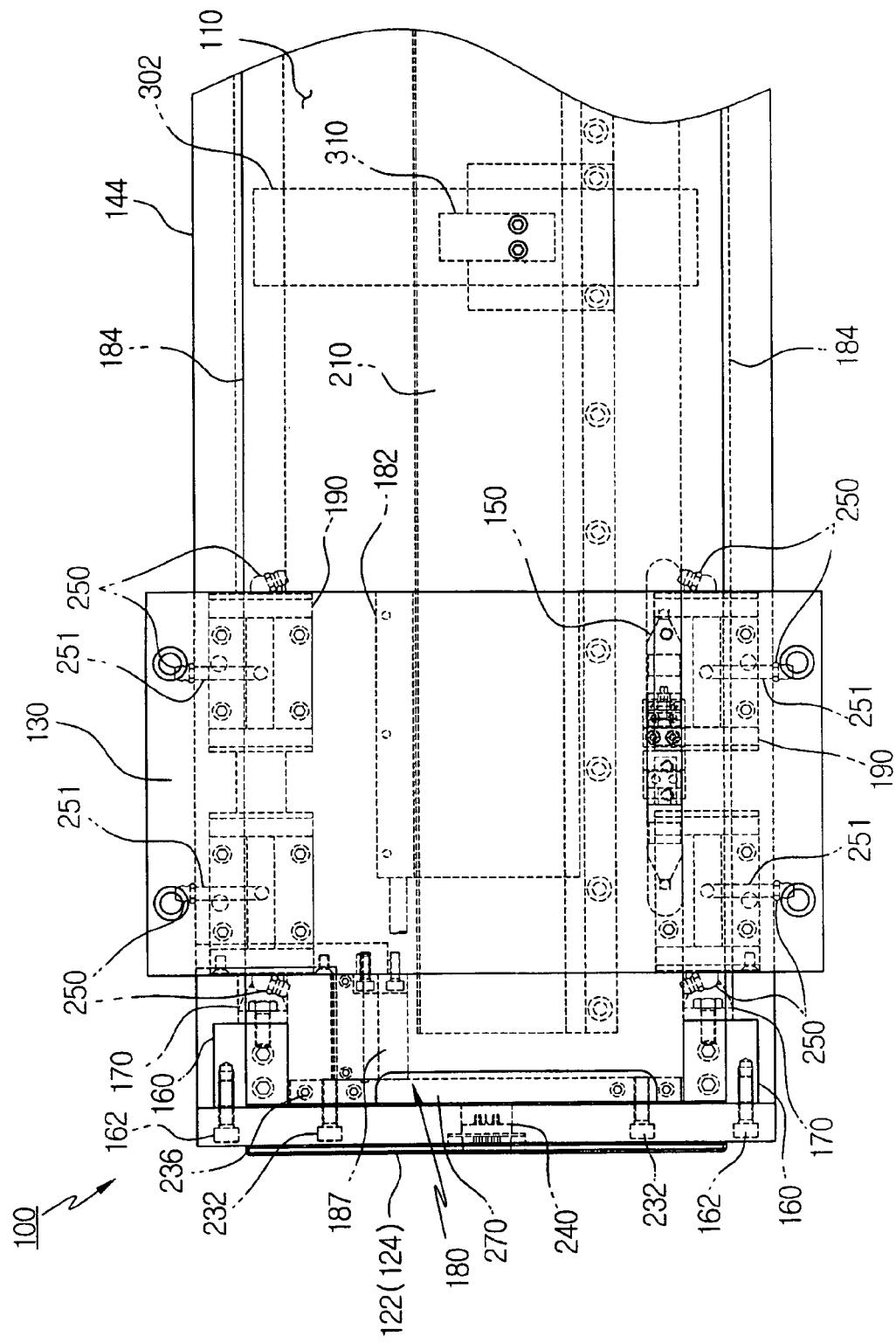
FIG. 10 is a plan view of the apparatus of FIG. 9.
Figure 11:
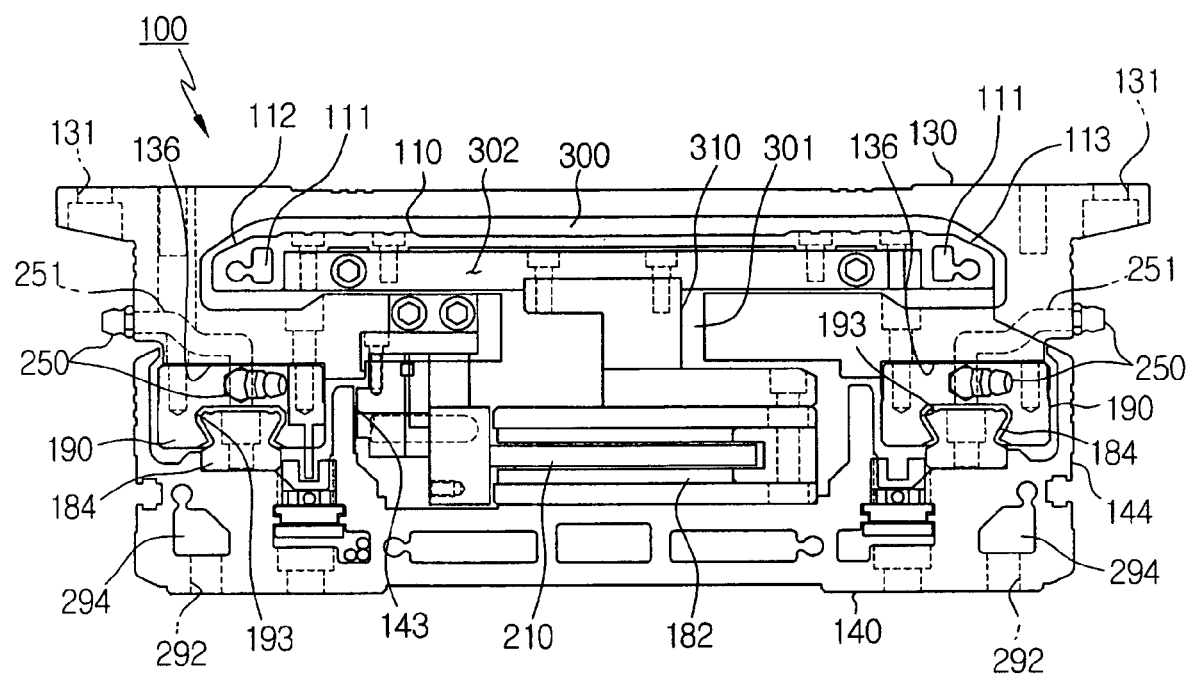
FIG. 11 is a cross sectional view of FIG. 9.

FIGS. 7 to 9 are respectively a perspective view, a plan view, and a cross sectional view showing the linear motor guide apparatus according to a second embodiment of the present invention.

In this embodiment, the upper portion of the table 130 is enclosed and so it forms an engaging space 300 thereunder. In the engaging space 300 is built the main cover 110 supported by the lateral covers 122, 124 which are attached to the both lateral ends of the main base 140. The lower portion of the engaging space 300 is open, thus forming an opening portion 301, so that the upper portion of supporting bodies 310 fixed at the lower portion thereof to the main base 140 is built in the opening portion and is engaged with the main cover 110 by means of fixing means. Owing to the above structure, even if the main base 140 is too elongated, the main cover 110 does not crook down.

It is preferable that each of the supporting bodies 310 is located spaced apart from a neighboring support body at 1 to 2 meter intervals.

Although the supporting body 310 and the main cover 110 may be coupled directly to each other, the supporting body 310 is preferably coupled to the main cover 110 through the agency of a coupling plate 302 attached to the bottom surface of the main cover 110, considering the slack or crook of the main cover 110.

Although, as in the main base 140, the main cover 110 may be implemented by one elongated body, it is preferably constructed by divided matters of 2 to 3 meter long, considering the convenience in maintenance.

Oil flowing channels 251 are penetratingly formed at the sides of the table 130, each of which is interconnected with the upper portion of the LM block 190 attached to the main base 140, the oil flowing channels supplying the LM rails 184 and the LM blocks 190 with lubricant. The oil flowing channel 251 includes a nipple 250 for oil supply, so as to supply oil to the LM rail 184 and the LM block 190 without separating the main cover 110.

Figure 12:
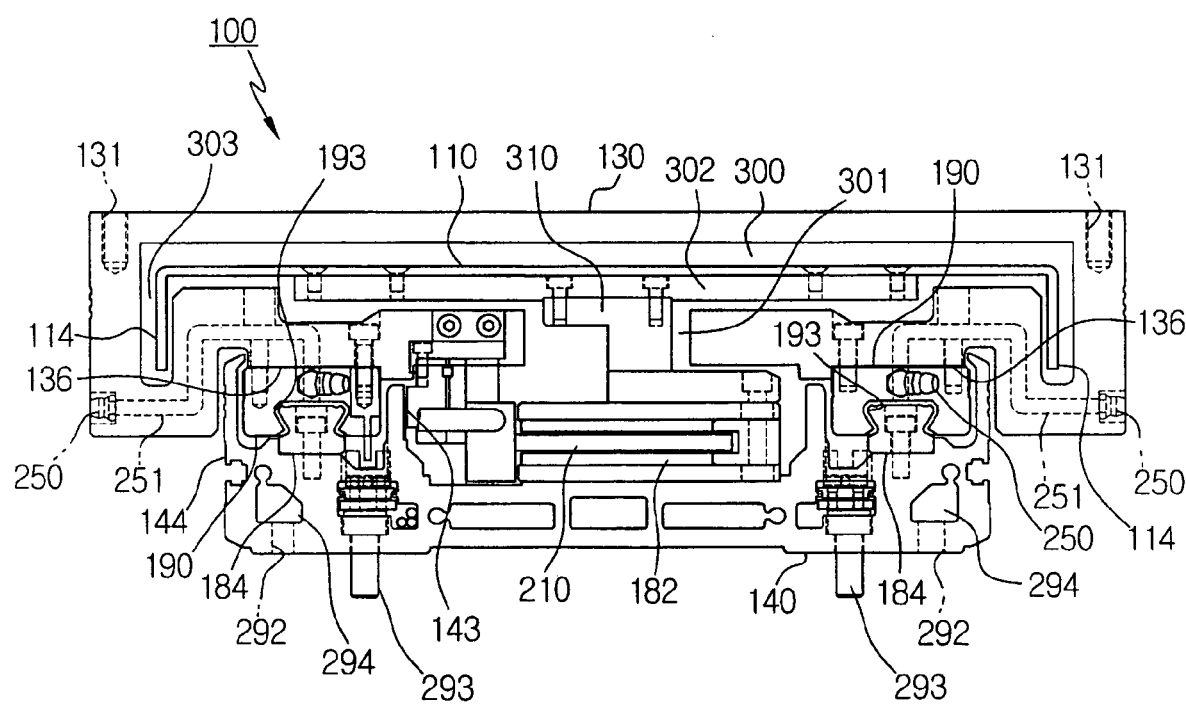
FIG. 12 is a cross sectional view showing a linear motor guide apparatus according to a third embodiment of the present invention.

FIG. 12 is a cross sectional view showing a linear motor guide apparatus according to a third embodiment of the present invention. In this embodiment, both sides of the main cover 110 are bent downward to form a bent side 114 which surrounds the outside of a body side 144 of the main base 140. To correspond to the bent side 114, both sides of the table 130 form side space portions 303 generally downward bent and the side space portion communicates with the engaging space 300 of the table 130. This construction is for effectively protecting the various alien substances, such as external elements, dust, etc., from entering the drive means of the linear motor guide apparatus, thereby securing an operating accuracy of the apparatus.

Now, the operation of the linear motor guide apparatus 100 constructed as above will be described.

A user may mount the linear motor guide apparatus 100 to a work robot (not shown) by the fixing member 292.

When the user supplies electric power to the linear motor guide apparatus 100 through the terminal 240 and turns on the drive means (not shown), the electric power is supplied to the linear motor stator 182 and the linear motor stator 182 and the linear motor rotor 210 are energized, so that the linear motor rotor 210 starts moving.

Traveling means including the linear motor rotor 210, the table 130, and the LM block 190 are moved in accordance with the LM block 190 moving along the LM rail 184. At this time, the scale head 187 with the scale block 180 attached to one side of the table 130 are reciprocally moved along the up-projecting partitions 142 and the scale 143 attached thereto. The user can measure the traveling distance through the scale 143 attached to the up-projecting partitions 142.

Also, the current position during traveling of the table 130 can be read by the sensor 150 disposed under the table 130 along the traveling path of the table 130 attached to the main base 140. The traveling distance of the table 130 may be displayed through the separate displaying device (not shown). The detailed explanation about this will be omitted.

In addition, the traveling direction of the table 130 may be controlled by the drive means (not shown), of course.

If the side of the table 130 touches the cushion 170 of the stopper block 160 after the table 130 travels a certain distance, the table 130 is stopped (see FIG. 3).

A reference numeral "250" refers to an oil nipple for supplying the lubricant. This supplies the lubricant to the LM rail 184 and the LM block 190, so that they can operate smoothly.

INDUSTRIAL APPLICABILITY

According to a linear motor guide apparatus of the present invention, the present invention has advantages in that:

By enlarging the longitudinal cross-section of the main cover 110 and coupling the hollowing portion formed at the lateral ends thereof and the elastic block, crooking down of the main cover 110 when in use can be prevented, and the tortional and longitudinal stiffness can be reinforced;

By providing the up-projecting partitions 148 in the main base 140 so as to reinforce the main base 140, twisting and longitudinal crooking of the main base can be prevented; the up-projecting partitions can prevent the oil, which leaks from between an LM (linear motor) rail 184 and an LM block 190, from flowing towards a scale 143, and can block the introduction of any alien substance. Further, it protects the residual grease on a surface of the LM rail 184 from scattering, during a fast reciprocal movement of a table 130, onto the surfaces of the scale head 187 fixed to the scale block 180 and a scale 143 attached to the up-projecting partitions 142, thereby securing the stable operation;

It is convenient to mount the apparatus according to the present invention, since a user can mount the apparatus to an operation robot in an upper position, and to a main frame either in an upper position or in a lower position;

Since the scale head is attached to the outside of the table 130 in the traveling direction, the attachment, adjustment and maintenance become easier;

According to the second and third embodiments of the present invention, since the main cover 110 does not crook down or be bent, the length of the main base 140 can be selected by 3 to 50 meters, thereby providing an excellently precise moving apparatus to various industrial machinery, automation machinery, facilities for manufacturing a semiconductor, LCD, or PDP, and testing equipments;

Since the main cover 110 and the table 130 does not contact, the operating noise can be reduced, the remnants is not created, and the swaying of the apparatus is repressed, thereby improving an accuracy in movement;

Since the main cover 110 cut by 2 to 3 meters can be used, the maintenance becomes simpler; and By supplying the lubricant to the LM rail 184 without separating the main cover 110, the convenience in maintenance of the apparatus is increased.

What is claimed is:

1. A linear motor guide apparatus mounted to a work robot, the apparatus comprising:
    a main base which is so sized as to allow the whole apparatus to have a predetermined width and length, and on which elements of the apparatus are mounted;
    drive means disposed on the main base;
    reciprocal moving means installed on the main base, for reciprocally moving a certain distance within the length of the whole apparatus in the longitudinal direction, by a driving force of the drive means; and
    a main cover installed on the reciprocal moving means, and engaged with lateral longitudinal-end covers coupled to both lateral longitudinal-end portions of the main base to cover both lateral longitudinal-end portions of the main base.

2. The apparatus according to claim 1, wherein the main cover is attached to an engaging space formed in a table an upper portion of which is enclosed, and
    an opening portion is formed at the lower portion of the engaging space, so that at least one supporting body is built in the opening portion to engage with the main cover, the supporting body being fixed at a lower portion thereof to the main base.

3. The apparatus according to claim 2, wherein both sides of the main cover are bent downward to form a bent side which surrounds the outside of a body side of the main base, both sides of the table form side space portions downward bent to correspond to the bent side, the side space portions communicating with the engaging space of the table.

4. The apparatus according to claim 1, wherein an LM (linear motor) rail, of which the flanks are respectively concaved along the longitudinal direction, is installed in the main base, to the extent of a predetermined length.

5. The apparatus according to claim 1, wherein the drive means is a linear motor stator.

6. The apparatus according to claim 1, wherein the main cover comprises:
    recesses inwardly concaved from the respective lateral ends of the main cover,
    elongated hollow portions formed near the ends of the recesses, and
    lateral covers fixed to the recesses by fixing means through the medium of an elastic block.

7. The apparatus according to claim 1, wherein the main base comprises:
    up-projecting partitions facing each other in a central portion in such a fashion as to spaced apart from each other by a certain width, one of the up-projecting partitions having a scale attached to an inner surface thereof so that the traveling distance can be measured; and
    up-projecting members, which has generally the same shape as that of the up-projecting partitions and each of which faces each the up-projecting partition.

8. The apparatus according to claim 4, wherein the reciprocal moving means comprises at least one LM (linear motor) block having a concaved portion whose shape and location is corresponding to the concaved portion of the LM rail, so that the LM block can linearly reciprocally move along the LM rail,
    the main cover is attached to an engaging space formed in a table, the LM block is attached to the bottom of the table, and
    the table includes a linear motor rotor facing the linear motor stator, and the table is located so that it can move in a non-contacting fashion along the edge surface of the main cover,
    whereby the reciprocal moving means reciprocally move by the interaction of the linear motor stator and the linear motor rotor.

9. The apparatus according to claim 8, wherein the reciprocal moving means comprises:
    a scale head, whose one side sildably moves along the up-projecting partitions of the main base and a predetermined shaped scale attached thereto, by which the traveling distance is measured; and
    a scale block, which is integrally coupled with the top portion of the scale head, and which is fixed at one end thereof on one side of the table through fixing means.

10. The apparatus according to claim 1, wherein four stopper blocks are positioned at the respective corners of the main base, so that they are fixed to the main base by fixing means, and also to the respective lateral covers by fixing means,
    whereby an end portion of the respective stopper blocks facing each other have a protruding cushion.

11. The apparatus according to claim 8, wherein a plurality of sensors for sensing the position of the reciprocal moving means installed on the main base along with the LM block, the sensors being arrayed at a predetermined location of the main base along the direction of the movement of the reciprocal moving means.

12. The apparatus according to claim 8, wherein the main base comprises fixing means including a tapped hole member formed at the bottom of the main base, and a bolt coupling member formed at the LM block, whereby the members are selected to upward or downward fix the apparatus with an external apparatus.

13. The apparatus according to claim 1, wherein a stepped penetration hole is formed on lateral longitudinal-end ends of the main cover.

14. The apparatus according to claim 8, wherein an oil flowing channel is penetratingly formed at the side of the table, each of which is interconnected with the LM block attached to the main base, the oil flowing channel including an oil supply nipple.

* * * * *